United States Patent [19]

Schuck

[11] Patent Number: 4,515,387
[45] Date of Patent: May 7, 1985

[54] HITCH WITH SWIVELING TONGUE

[76] Inventor: Howard L. Schuck, 705 Meadowview Dr., Celina, Ohio 45822

[21] Appl. No.: 478,649

[22] Filed: Mar. 25, 1983

[51] Int. Cl.³ .............................................. B60D 1/00
[52] U.S. Cl. ............................... 280/478 A; 267/138; 280/478 B
[58] Field of Search .......... 280/478 R, 478 A, 478 B, 280/486; 267/140, 153, 138; 292/153, 194, 228

[56] References Cited

U.S. PATENT DOCUMENTS

| 3,622,182 | 11/1971 | Grosse-Rhode | 280/478 A |
| 3,838,778 | 10/1974 | Appleton | 267/138 |
| 3,904,226 | 9/1975 | Smalley | 280/486 |
| 4,007,945 | 2/1977 | Casad et al. | 280/478 B |

FOREIGN PATENT DOCUMENTS 1405258  9/1975  United Kingdom ........... 280/478 A

Primary Examiner—Joseph F. Peters, Jr.
Assistant Examiner—Michael Mar
Attorney, Agent, or Firm—Fraser & Clemens

[57] ABSTRACT

A hitch assembly includes an outer housing adapted to be attached to a propelled vehicle, an inner housing enclosed by the outer housing and a tongue member partially enclosed by the inner housing and adapted to be connected to a vehicle to be towed. A selectively releasable latching mechanism mounted on the outer housing retains the inner housing in a first latched position to prevent relative movement between the housings. When the latching mechanism is released, the inner housing is free to be moved to a second position where it is pivotally connected to the outer housing to permit movement of the tongue member through an arc in a horizontal plane to aid in the connection to the vehicle to be towed. The hitch assembly can also be provided with shock absorbing cushions in the inner housing to absorb and dissipate starting and stopping shock loads.

14 Claims, 6 Drawing Figures

HITCH WITH SWIVELING TONGUE

SUMMARY OF THE INVENTION

The present invention concerns a hitch for towing vehicles and in particular a hitch having a swiveling tongue.

In the prior art, there are many trailer hitches which are adapted to be attached to a propelled vehicle, such as a tractor or a truck, for towing trailers or similar vehicles. Typically, such hitches are attached to the frame of the propelled vehicle with the tongue extending rearwardly in a fixed position for attachment to the vehicle to be towed. Generally, the tongue is fitted with an upstanding ball which cooperates with a cup-shaped element on the end of a tongue extending from the forward end of the trailer. The ball and cup connection permit relative movement between the propelled vehicle and the trailer in a horizontal plane about the point defined by the ball and cup connection.

An improvement in the prior art trailer hitch is disclosed in U.S. Pat. No. 3,904,226 as a hitch construction embodying a shock absorbing cushion in the form of compressible bushings surrounding a portion of the hitch tongue. The bushings are located in a housing which provides for deflection of the bushings within predetermined limits to absorb and dissipate starting and stopping forces transmitted through the tongue.

The present invention incorporates a selectively releasable latching mechanism for retaining a tongue and inner housing within an outer housing which is attached to the frame of the propelled vehicle. The tongue and inner housing can be of a construction which incorporates shock absorbing cushion elements. For example, a pair of cushion elements mounted on the tongue at opposite ends of the inner housing can be utilized to absorb shocks applied during starting and stopping by being compressed during relative movement between the tongue and the inner housing.

In the latched position, the hitch according to the present invention functions in a manner similar to a prior art shock absorbing hitch. However, when the latch is released, the tongue and inner housing are free to move relative to the outer housing to a position where the inner housing is pivotally connected to the outer housing whereby the tongue and inner housing can be swiveled in a predetermined horizontal arc for easy attachment of the propelled vehicle to the trailer.

It is an object of this invention to provide a hitch which reduces the effort required to connect a trailer to a propelled vehicle.

It is a further object of the present invention to provide a hitch with a shock absorbing means for dissipating the shock loads generated when starting and stopping a towed trailer.

Further objects and advantages of the invention will be readily apparent to those skilled in the art from the following detailed description, taken in conjunction with the annexed sheets of drawings, on which is shown a preferred embodiment of the invention.

DETAILED DESCRIPTION OF THE INVENTION

Figure 1:
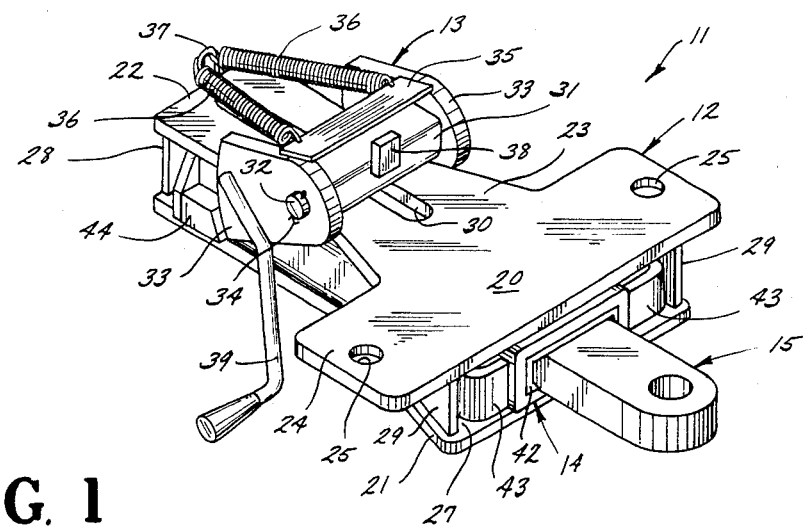
FIG. 1 is a perspective view of a hitch according to the present invention with the tongue latched in a retracted position.
Figure 2:
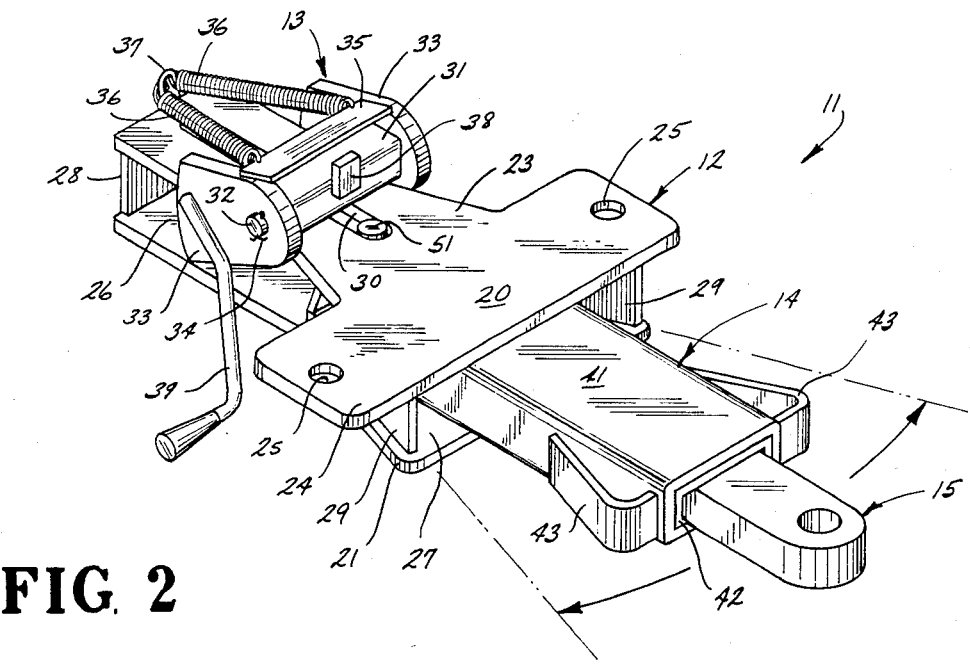
FIG. 2 is a perspective view of the hitch shown in FIG. 1 with the tongue shown in an extended, unlatched position.

Referring now to the drawings, FIGS. 1 and 2 show a hitch 11 for use on a propelled vehicle such as a tractor or truck to enable a trailer to be towed. The hitch 11 includes an outer housing 12 having a selectively releasable latching mechanism 13 mounted thereon, an inner housing 14 enclosed by the outer housing 12, and a tongue assembly 15 enclosed by the inner housing 14.

The outer housing 12 includes a pair of spaced apart generally parallel plates, upper plate 20 and lower plate 21. Upper plate 20 is formed with a relatively narrow forward end portion 22, a center portion 23 which tapers outwardly from the end 22, and a relatively wide, generally rectangular rearward portion 24. The rearward portion 24 has a pair of mounting apertures 25 formed adjacent side edges thereof for accepting fastening means (not shown) for attaching the hitch 11 to the propelled vehicle. The lower plate 21 has a relatively narrow forward end portion 26 and a rearward portion 27 which tapers outwardly at approximately the same angle as the center portion 23 of the upper plate 20. The upper plate 20 and the lower plate 21 are maintained in their spaced apart, parallel relationship by vertically extending spacer plates, a front spacer plate 28 and a pair of side spacer plates 29. The spacer plates 28 and 29 are attached to the facing surfaces of the upper and lower plates 20 and 21 by any suitable means such as welding.

Figure 4:
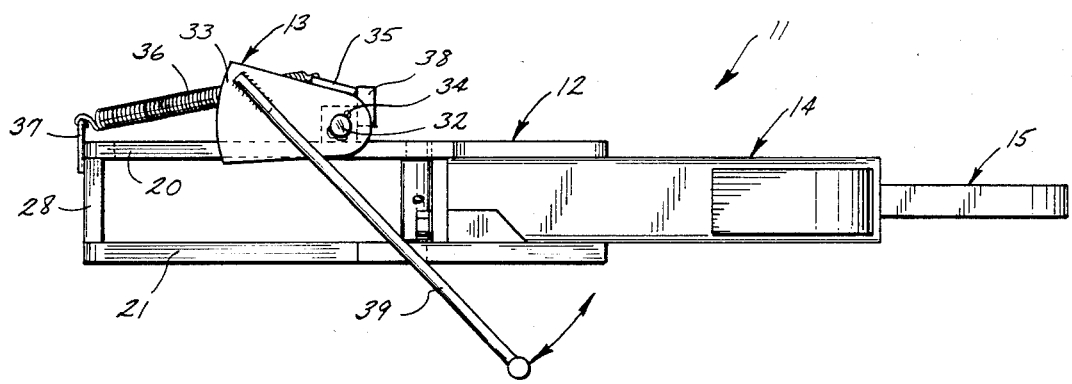
FIG. 4 is a side elevation of the hitch of FIG. 1 with a portion of the outer housing cut away to show the tongue and inner housing in an extended position.
Figure 5:
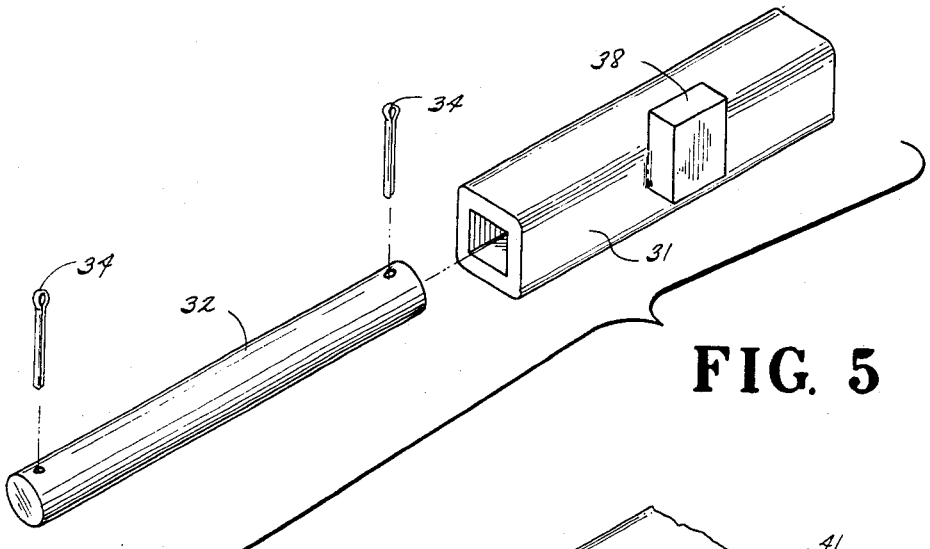
FIG. 5 is an exploded perspective view of the pivotal mounting for the latching mechanism of the hitch shown in FIG. 1.

As shown in FIGS. 1, 2, and 4, the latching mechanism 13 includes a tubular pivot shaft sleeve bearing 31 fixedly attached to the upper surface of the upper plate 20 approximately at the intersection of the forward portion 22 and the center portion 23. The pivot shaft bearing 31 encloses a pivot shaft 32 which extends beyond the ends of the bearing 31. Each end of the pivot shaft 32 extends through an aperture formed in one of a pair of cams 33. The pivot shaft 32 is retained in the shaft bearing 31 by a pair of cotter pins 34 which extend through apertures formed in the ends of the pivot shaft 32 adjacent the outwardly facing surfaces of the cams 33. The pivot shaft bearing 31, the pivot shaft 32 and the cotter pins 34 are also shown in more detail in exploded perspective view FIG. 5.

An attachment plate 35 has its ends attached to an upper edge of each of the cams 33 such that the cams 33 are forced to pivot about the shaft 32 together. A pair of springs 36 are connected between the attachment plate 35 and a generally U-shaped post 37 which is fastened at the junction of the upper plate 20 and the front spacer plate 28. The springs 36 force the cams to the position shown in FIGS. 1 and 2 whether the inner housing 14 and tongue assembly 15 are in the retracted or extended positions. As will be explained, a stop 38 is attached to the bearing 31 and a lever arm 39 is attached to one of the cams 33.

The inner housing 14 has a generally rectangularly shaped tubular body 41. A generally rectangular collar 42 is attached to the rearward end of the body 41 to reduce the size of the aperture through which the tongue assembly 15 extends. A pair of L-shaped stops 43 are attached to opposite sides of the body 41 near the rearward end. The stops define a rearward end of the body 41 which is tapered in plan view to match the taper of the upper and lower plates 20 and 21 and the angle at which the side spacer plates 29 are positioned. Thus, when the body 41 is in the retracted position as shown in FIG. 1, the inner housing 14 and the tongue assembly 15 are wedged in the outer housing 12 to prevent any side-to-side movement of the tongue. In this position, the hitch functions much as a prior art type of hitch.

Figure 6:
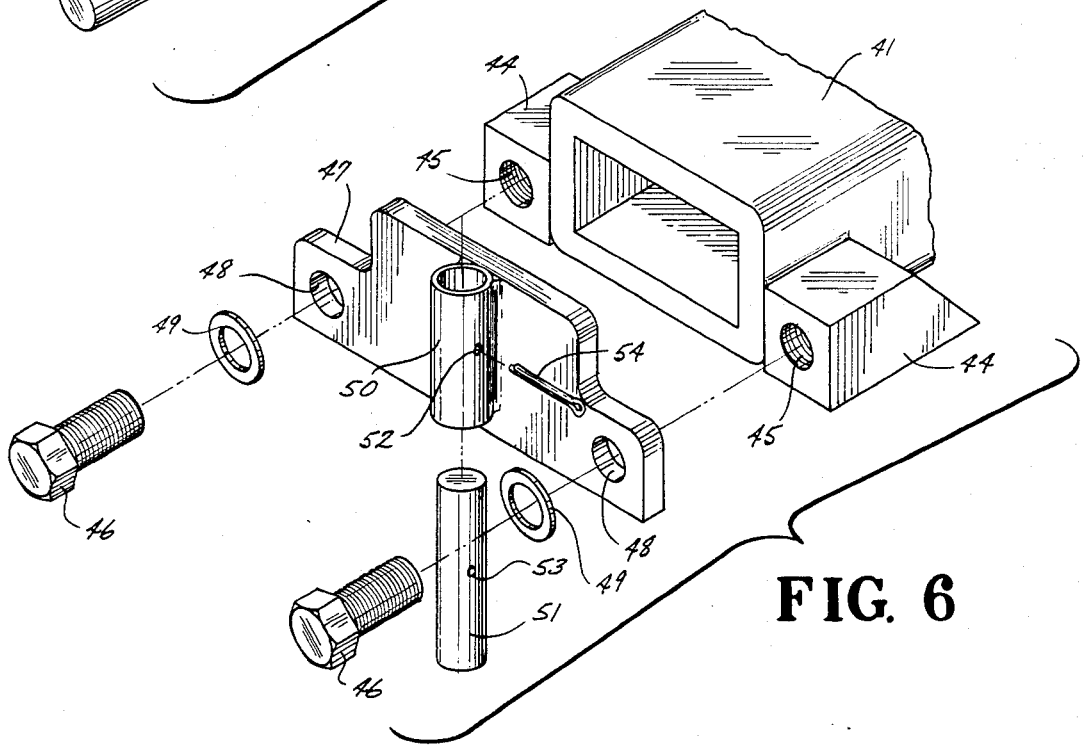
FIG. 6 is an exploded perspective view of the rearward end of the inner housing of the hitch of FIG. 1.

As shown in more detail in FIG. 6, the forward end of the body 41 includes a pair of wedges 44 attached to the body 41 on opposite sides thereof. Each of the wedges 44 has a forwardly facing aperture 45 formed therein which can be threaded for receiving a fastener such as a bolt 46. After the tongue assembly 15 has been inserted in the front opening of the body 41, the front opening is closed by an end plate 47 having a pair of apertures 48 formed therein. The apertures 48 are spaced to match the apertures 45 and receive the bolts 46. The bolts 46 each receive a lock washer 49 before being passed through the corresponding aperture 48 and threaded into the corresponding aperture 45.

A vertically extending sleeve bearing 50 is attached to an outer surface of the end plate 47 and has a longitudinally extending bearing surface formed therein to receive a pin 51. The sleeve bearing 50 also has a diametrically extending aperture 52 formed therein. The pin 51 also has a diametrically extending aperture 53 formed therein and, when the pin 51 is inserted into the bearing surface of the sleeve bearing 50, and the apertures 52 and 53 are lined up, a cotter pin 54 can be inserted into the apertures 52 and 53 to retain the pin 51 in the sleeve bearing 50.

The upper plate 20 has a longitudinally extending slot 30 formed in the forward portion 22 and center portion 23. The lower plate 21 has a corresponding slot (not shown) formed therein. The slots in the upper and lower plates 20 and 21 receive the respective ends of the pin 51 which is free to slide therein as the inner housing 14 is extended and retracted with respect to the outer housing 12. Furthermore, when the inner housing 14 is in the extended position, the inner housing 14 and the tongue assembly 15 can be swiveled about the pin 51 as a pivot point as shown by the arrows in FIG. 2. The arc of movement of the inner housing is defined by the position of the side spacer plates 28 and the location of the pin 51 in the slot 30.

When the lever arm 39 is rotated about the pivot shaft 32, as shown by the arrows in FIG. 4, the cams 33 and the attachment plate 35 also rotate. The rotation in the clockwise direction is limited by the stop 38 attached to the rear surface of the pivot shaft bearing 31 and extending above the upper surface of said bearing. The rotation of the cams is limited in the opposite direction by the wedges 44 which are positioned to stop the rotation of the cams when the inner housing 14 is in the retracted position wherein the stops 43 are wedged against the side spacer plates 29. If the inner housing is in the extended position, the cams 33 will be rotated until the springs 36 are shortest.

Figure 3:
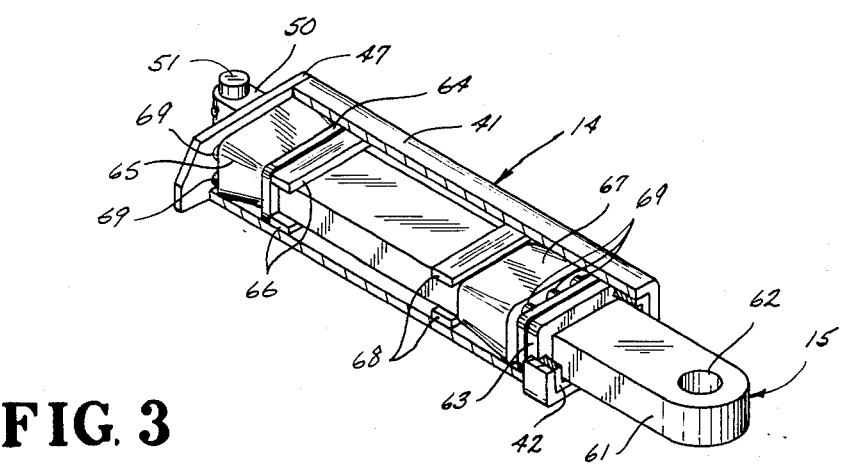
FIG. 3 is a perspective view of the tongue and inner housing of the hitch shown in FIG. 1 with a portion of the inner housing cut away to show the shock absorbing cushions.

As shown in FIG. 3, the tongue assembly 15 includes a tongue element 61 having an aperture 62 formed in the rearward end thereof for receiving an attaching element such as a ball, a pin or the like. A bearing element 63 is attached near the rearward end of the tongue 61 and is sized to engage the inner walls of the body 41 and guide the tongue 61 in movement along the longitudinal axis of the body. A second bearing element 64 is positioned near the front end of the tongue 61 to perform a similar function in the body 41. The bearing elements 63 and 64 can be formed from any suitable material such as a high density polyethylene. An elastomeric cushion element 65 encloses the forward portion of the tongue 61 on one side of the bearing element 64 and a stop 66 is attached to the tongue on the opposite side of the bearing 64. A second elastomeric cushion element 67 encloses a portion of the tongue 61 adjacent the forward side of the bearing element 63 and a stop 68 is attached to the tongue at the forward end of the cushion 67. The cushions 65 and 67 can be formed from a suitable material such as urethane.

When there is no load on the tongue assembly 15, the forward end of the cushion 65 engages the inner wall of the end plate 47 and the rearward end of the cushion 67 engages the inner face of the bearing element 63. When a trailer is attached to the tongue 61 and the propelled vehicle is started forward, a shock load will be generated through the outer housing 12 and the inner housing 14 to the bearing element 63. The trailer and the tongue 61 will tend to remain in position and the cushion 67 will be compressed to absorb and dissipate the shock load. When the propelled vehicle stops, the trailer and tongue 61 will tend to stay in motion generating a shock load through the tongue 61 tending to compress the cushion 65 between the bearing element 64 and the end plate 47. The cushion 65 thereby absorbs and dissipates the shock load upon the stopping of the vehicle. The cushions 65 and 67 each have a plurality of generally cylindrical bumps or protuberances 69 formed on are surface thereof. The cushion 65 has bumps 69 formed on the surface facing the inner surface of the end plate 47. The cushion 67 has bumps 69 formed on the surface facing the inner surface of the bearing element 63. Since these bumps have less cross-sectional area than the cushions in a plane perpendicular to the axis of the shock forces, they will tend to compress under relatively lighter shock loads such as starting and stopping an empty trailer.

In summary, the present invention concerns a hitch assembly or apparatus including a mounting member adapted to be attached to a propelled vehicle and a tongue member adapted to be connected to a vehicle to be towed. The tongue member can include a tongue element partially enclosed by an inner housing containing shock absorbing means such as compressible cushions having protuberances formed thereon, the protuberances absorbing lighter loads and the body of the cushion absorbing heavier loads. The outer housing has a selectively releasable latching means or mechanism attached thereto for maintaining the inner housing in a first position to prevent relative movement between the two housings. When the latch is released, the inner housing can be moved to a second position where the inner housing is pivotally connected to the outer housing for limited movement in a horizontal plane.

In accordance with the provisions of the Patent Statutes, the principle and mode of operation of the invention have been explained and illustrated in its preferred embodiment. However, it must be understood that the invention can be practiced otherwise than as specifically illustrated and described without departing from its spirit or scope.

What is claimed is:

1. A hitch assembly comprising: a mounting member adapted to be attached to a propelled vehicle, a tongue member adapted to be connected to a vehicle to be towed, and pivotal connection means attached to said mounting and tongue members for allowing relative movement between said mounting and tongue members whereby said tongue member can be moved relative to the propelled vehicle to a position for attachment to the vehicle to be towed and including selectively actuatable latching means attached to said mounting member for latching said mounting member and said tongue member in a first position the prevent relative pivotable movement between said members wherein said tongue member includes a wedge and said latching means includes a cam for engaging said wedge to prevent said relative pivotal movement.

2. A hitch assembly according to claim 1 wherein said pivotal connection means includes a sleeve bearing attached to said tongue member, a pair of apertures formed in said mounting member and a pin inserted in said sleeve bearing and engaging said apertures.

3. A hitch assembly according to claim 2 including a diametrically extending aperture formed in each of said sleeve bearing and said pin and a cotter pin inserted in said diametrically extending apertures for retaining said pin in said bearing.

4. A hitch assembly according to claim 2 wherein said apertures are formed as slots for allowing relative movement between said mounting member and said tongue member along the longitudinal axis of said slots.

5. A hitch assembly according to claim 1 wherein said cam is pivotally attached to said mounting member and including a lever arm attached to said cam for selectively rotating said cam out of engagement with said wedge to allow said tongue member to move to a second position for relative movement with respect to said mounting member.

6. A hitch assembly according to claim 5 including a spring attached to said cam and to said mounting member for urging said cam into engagement with said wedge.

7. A hitch assembly according to claim 1 including means attached to said mounting member for limiting movement of said tongue member in a horizontal plane.

8. A hitch assembly according to claim 1 including shock absorbing means attached to said tongue member for absorbing and dissipating shock loads applied to said mounting and tongue members.

9. A hitch assembly according to claim 8 wherein said shock absorbing means includes a cushion mounted between said tongue member and said mounting member for absorbing said shock loads by compression.

10. In a hitch apparatus having a mounting member adapted to be attached to a propelled vehicle and a tongue member adapted to be connected to a vehicle to be towed, the improvement comprising: a housing attached to the mounting member, means for pivotally connecting the tongue member to said housing, and latching means attached to said housing for maintaining the tongue member in a first position to prevent relative pivotal movement between the tongue member and the housing and for releasing the tongue member to a second position to permit said relative pivotal movement wherein said latching means includes a sleeve bearing attached to said housing, a pivot shaft pivotally retained in said sleeve bearing, a pair of cams pivotally mounted on said pivot shaft, an attachment plate attached to said cams, a lever arm attached to one of said cams, spring means connected between said attachment plate and said housing for urging said cams into engagement with a pair of wedges attached to said housing to maintain the tongue member in said first position, whereby rotation of said lever arm against the urging of said spring means rotates said cams out of engagement with said wedges to release the tongue member for movement to said second position.

11. A hitch apparatus according to claim 10 wherein said means for pivotally connecting includes a sleeve bearing attached to the tongue member, a slot forming in said housing, and a pin inserted in said sleeve bearing and engaging said slot.

12. A hitch apparatus according to claim 10 wherein the tongue member includes an inner housing attached to said mounting member by said means for pivotally connecting and wherein the tongue member includes a tongue element having a forward portion enclosed by said inner housing and shock absorbing means positioned in said inner housing and compressible between said inner housing and said tongue element for absorbing shock loads applied to the hitch apparatus during starting and stopping of the propelled and towed vehicles.

13. A hitch apparatus according to claim 12 wherein said shock absorbing means has a body with a surface perpendicular to the direction of application of the shock loads and a plurality of protuberances extending from said surface into contact with said inner housing.

14. A hitch apparatus according to claim 10 wherein said housing includes an outer housing attached to the mounting member and the tongue member includes an inner housing enclosed by said outer housing and movable with respect thereto between said first and second positions, and wherein said outer housing includes means for limiting relative pivotal movement of said inner housing with respect to said outer housing.

* * * * *